United States Patent

Shiraki et al.

[19]

[11] Patent Number: 6,065,364
[45] Date of Patent: May 23, 2000

[54] STOPPER FOR USE IN AN INDUSTRIAL ROBOT

[75] Inventors: Tomoyuki Shiraki; Toshiaki Iwanaga; Shigeo Matsushita; Kazuhiro Haniya, all of Fukuoka, Japan

[73] Assignee: Kabushiki Kaisha Yaskawa Denki, Kitakyushu, Japan

[21] Appl. No.: 09/043,387

[22] PCT Filed: Sep. 17, 1996

[86] PCT No.: PCT/JP96/02647

§ 371 Date: Mar. 17, 1998

§ 102(e) Date: Mar. 17, 1998

[87] PCT Pub. No.: WO97/10933

PCT Pub. Date: Mar. 27, 1997

[30] Foreign Application Priority Data

Sep. 18, 1995 [JP] Japan .................................. 7-264888
Apr. 8, 1996 [JP] Japan .................................. 8-112082

[51] Int. Cl.[7] .................................................. G05G 11/00
[52] U.S. Cl. .......................... 74/490.01; 74/526; 901/12
[58] Field of Search ............................... 74/526, 490.01; 192/149, 139, 138; 901/12; 414/918

[56] References Cited

U.S. PATENT DOCUMENTS 4,632,632 12/1986 Simone .............................. 414/744 A
4,828,094 5/1989 Torii et al. .............................. 192/139
5,193,658 3/1993 Tellén ......................................... 901/13
5,771,753 6/1998 Kwon et al. ............................... 74/526
5,839,322 11/1998 Genov et al. ............................. 74/526

FOREIGN PATENT DOCUMENTS 3829755 3/1989 Germany .
2-160497 6/1990 Japan .

OTHER PUBLICATIONS

Communication from European Patent Office dated Oct. 27, 1998, including International Search Report.

*Primary Examiner*—Tamara L. Graysay
*Assistant Examiner*—David Fenstermacher
*Attorney, Agent, or Firm*—Morgan, Lewis & Bockius LLP

[57] ABSTRACT

A stopper includes a frame (51) fixed to a mount base (1) of an industrial robot, a retaining shaft (52) which is fixed to the frame (51) in an upright position in relation to the plane of rotation of the turning base (2), a rod-shaped engagement lever (53) which is supported so as to be able to turn around the retaining shaft (52), a spring (57) for returning the engagement lever (53) to a position where it faces the center of the turning base (2), stoppers (59A, 59B) provided on both inner surfaces of the frame (51) which face the engagement lever (53), and an engagement dog (7) which is fixed to the turning base (2) and is capable of engaging the engagement lever (53). It is possible to provide a stopper for use with an industrial robot which permits setting of the operating angle of the turning base to a value of 360° or more and which ensures a wide range of operation.

20 Claims, 7 Drawing Sheets

STOPPER FOR USE IN AN INDUSTRIAL ROBOT

FIELD OF THE INVENTION

The present invention relates to a stopper of a rotary shaft mechanism of an industrial robot, and more particularly, to a stopper capable of detecting an overrun in a case where the limit of operating angle of a rotary shaft mechanism is set to a value of 360° or greater.

BACKGROUND ART

As shown in FIG. 7, for example, an existing industrial robot comprises a mount base 1, a turning base 2 which turns around the S axis over the mount base 1, and a robot arm 3 which is mounted on the turning base 2 and includes a plurality of joints. A stopper 4 is attached to the mount base 1 and the turning base 2 for the purpose of mechanically hindering the rotation of the turning base 2 when the operating angle of the turning base 2 reaches a preset limit and generating a signal upon detection of an overrun. As shown in FIG. 8, the stopper 4 comprises a fixed section 41 attached to the mount base 1; a movable section 42 attached to the turning base 2; a dog 43 which is attached to the movable section 42 so as to be movable in the tangential direction of a clearance circle of the turning base 2; springs 44, each of which holds the dog 43 at the center of the movable section 42; and a detector 45 for detecting the operation of the dog 43. When the turning base 2 exceeds a predetermined operating angle, the fixed section 41 comes into collision with the dog 43 and moves that dog 43. The detector 45 then detects the movement of the dog 43 and generates a signal, thereby deactivating a drive motor (not shown) of the turning base 2. If the turning base 2 turns further, the movable section 42 comes into collision with the fixed section 41, thereby mechanically hindering the turning action of the turning base 2 (as disclosed in, e.g., Japanese Patent Laid-open No. Hei. 2-160497).

The problem of the foregoing existing technique is that the limit of operating angle of the turning base cannot be set to a value in the vicinity of 360° or beyond a value of 360°. More specifically, the existing technique has the following problem. As shown in FIG. 8, there are two limits to the extent to which the turning base 2 turns, namely, one limit (position A) where the movable section 42 of the stopper 4 comes into collision with one side surface of the fixed section 41 as a result of counterclockwise turning of the turning base 2, and a limit (position B) where the movable section 42 comes into collision with the opposite side surface of the fixed section 41 as a result of the clockwise turning of the turning base 2. In order to set the limit of operating angle of the turning base 2 to a large value, the counterclockwise limit (position A) and the clockwise limit (position B) must be brought closer together. Further, in order to set the limit of operating angle of the turning base to a value of 360° or more, the counterclockwise extent of operation of the turning base and the clockwise extent of operation of the turning base must be superimposed on each other. However, according to the existing technique, the counterclockwise limit (i.e., position A) and the clockwise limit (i.e., position B) cannot be brought closer together across the limits of size of the fixed section 41 and the movable section 42; that is, a dead space shown in the drawing. For this reason, the operating angle of the turning base 2 cannot be set to a value of 360° or more. Further, even if the operating angle is set to a value less than 360°, it is difficult to set the operating angle to a value close to 360°.

As a matter of course, elimination of the stopper 4 can also be selected. However, in order to protect a drive cable or the like (not shown) of the robot arm 3 connected between the mount base 1 and the turning base 2, the operating angle of the turning base 2 must be mechanically limited. Therefore, there is a demand for a stopper capable of setting the limit of operating angle of the turning base 2 to a value of 360° or more.

DISCLOSURE OF THE INVENTION

An object of the present invention is to provide a stopper for use with an industrial robot capable of setting the limit of operating angle of a turning base to a value of 360° or more.

To accomplish the foregoing object, the present invention provides a stopper for use with an industrial robot including a mount base, a turning base capable of turning over the mount base about a pivot extending in the vertical direction, a fixed engagement section fixed to the mount base, a turning engagement section fixed to the turning base, and the fixed engagement section engaging the turning engagement section as a result of turning of the turning base, the improvement being characterized by further comprising:

a frame fixed to the mount base;

a retaining shaft which is fixed to the frame in an upright position in relation to the plane of rotation of the turning base;

a rod-shaped engagement lever which is supported so as to be able to turn around the retaining shaft;

a tension spring for returning the engagement lever to a position where it faces the center of the turning base, i.e., a neutral position;

stoppers provided on both inner surfaces of the frame which face the engagement lever; and an engagement dog which is fixed to the turning base and is capable of engaging the engagement lever.

The stopper further comprises a cam attached to the engagement lever and a position detector which detects an overrun of the turning base when engaging the cam.

Two engagement dogs are provided at arbitrary positions around the turning base.

One end of the tension spring is held by the engagement lever by way of a pin at a position close to the center of the turning base with reference to the retaining shaft. The other end of the tension spring is held by a pin attached to the inner side of the frame at a position which is closer than the foregoing end of the tension spring to the center of the turning base.

The tension spring may be replaced with a leaf spring which is provided in tandem with the engagement lever held in a neutral position. The leaf spring is fixed at one end by the frame and is fixed at the other end by the engagement lever.

The operating angle of the turning base can be increased by the angle corresponding to the pivotal stroke of the engagement lever through use of the foregoing means. Accordingly, if the pivotal stroke is increased, the limit of operating angle of the turning base can be set to a value of 360° or more.

Since the two engagement dogs are disposed at arbitrary positions around the turning base, the limit of operating angle of the turning base can be arbitrarily set.

Since the tension spring is extended between the engagement lever and the frame, the engagement lever returns to the neutral position when the engagement dogs are disengaged from the engagement lever.

In place of the tension spring, a leaf spring may be disposed in tandem with the engagement lever held in a neutral position. Even if the leaf spring is fixed at one end to the frame and is fixed at the other end to the engagement lever, the engagement lever can return to the neutral position.

BEST MODE FOR CARRYING OUT THE PRESENT INVENTION

Figure 1:
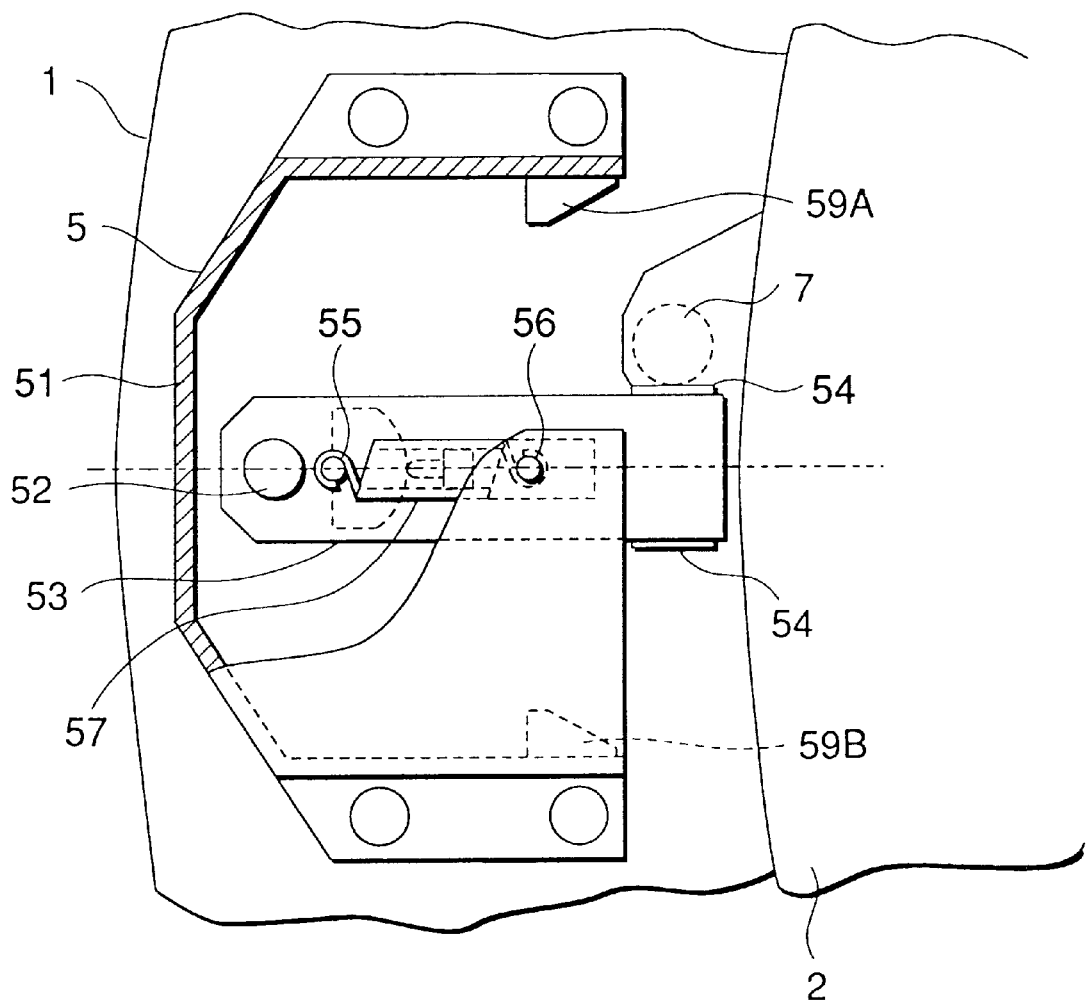
FIG. 1 is a plan view showing the principal elements of a stopper for use with an industrial robot according to a first embodiment of the present invention.
Figure 2:
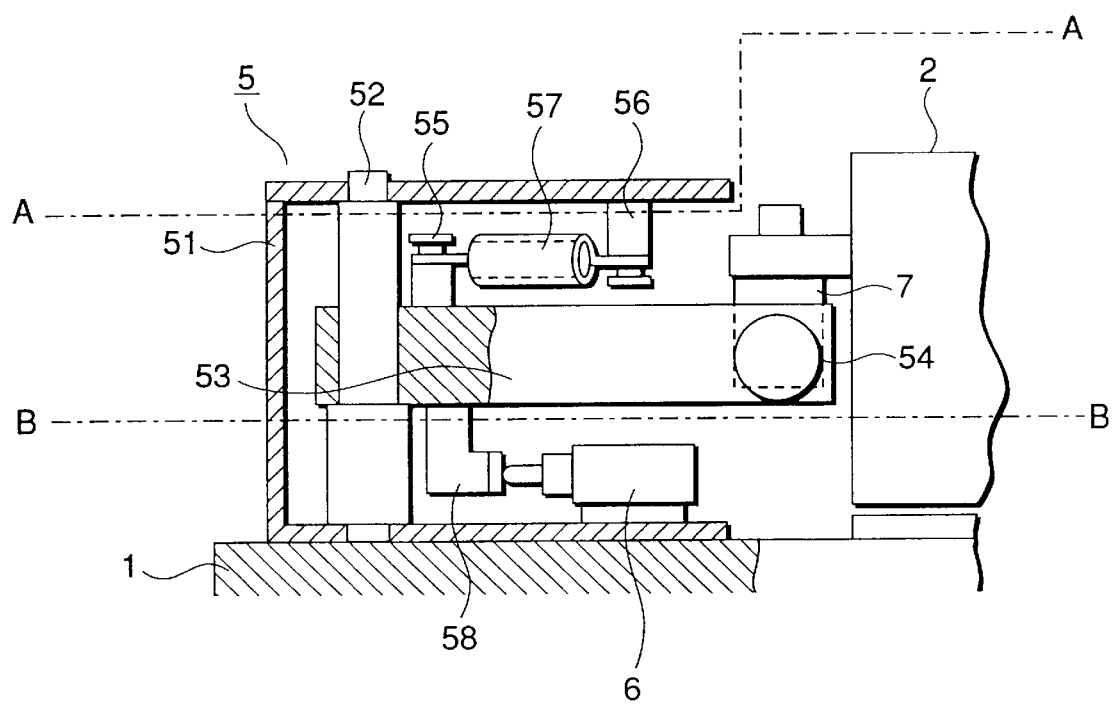
FIG. 2 is a sectional side view showing the principal elements of the stopper according to the first embodiment of the present invention.

With reference to the embodiments shown in the drawings, the present invention will now be described. FIG. 1 is a plan view showing the principal elements of a stopper for use in an industrial robot according to a first embodiment of the present invention, and FIG. 2 is a sectional side view showing the stopper.

In the drawings, reference numeral 1 designates a mount base; 2 designates a turning base; and 5 designates a stopper. Reference numeral 51 designates a frame mounted on the mount base 1; 52 designates a retaining shaft which is fixed in an upright position in relation to the direction in which the turning base 2 turns; 53 designates a rod-shaped engagement lever which is supported so as to be able to turn around the retaining shaft 52 and extends toward the center of the turning base 2; and 54 designates buffer members provided on both sides of the engagement lever 53 in the direction in which the engagement lever 53 turns. Reference numeral 55 designates a pin mounted in an off-center position on the engagement lever 53 in relation to the retaining shaft 52; 56 designates a pin attached to a position on the inner side of the frame 51 which is spaced away from the retaining shaft 52 toward the center of the turning base 2; and 57 designates a tension spring which is connected at both ends to the pins 55 and 56 and acts on the engagement lever 53 so as to return the engagement lever toward the center of the turning base 2 without reference to the position of the engagement lever 53. Reference numeral 58 designates a cam downwardly protruding from the engagement lever 53; and reference numerals 59A, 59B designate stoppers with which the engagement lever 53 that is rotating comes into collision and which are fixed on both inner sides of the frame 51 facing the engagement lever 53. Reference numeral 6 designates a position detector which engages the cam 58 to thereby detect an overrun of the turning base 2 when the engagement lever 53 is within the specific range of angles. Reference numeral 7 designates an engagement dog mounted on the turning base 2 and is designed to engage the engagement lever 53 by way of the buffer member 54 when the turning base 2 turns through a given angle.

By reference to FIGS. 3 and 4, the operation of the stopper will be described.

When the turning base 2 turns clockwise through a given angle, the engagement dog 7 comes into collision with the buffer member 54 of the engagement lever 53, turning the engagement lever 53 around the retaining shaft 52 until it comes into collision with the stopper 59A to thereby stop the turning base 2.

Figure 4:
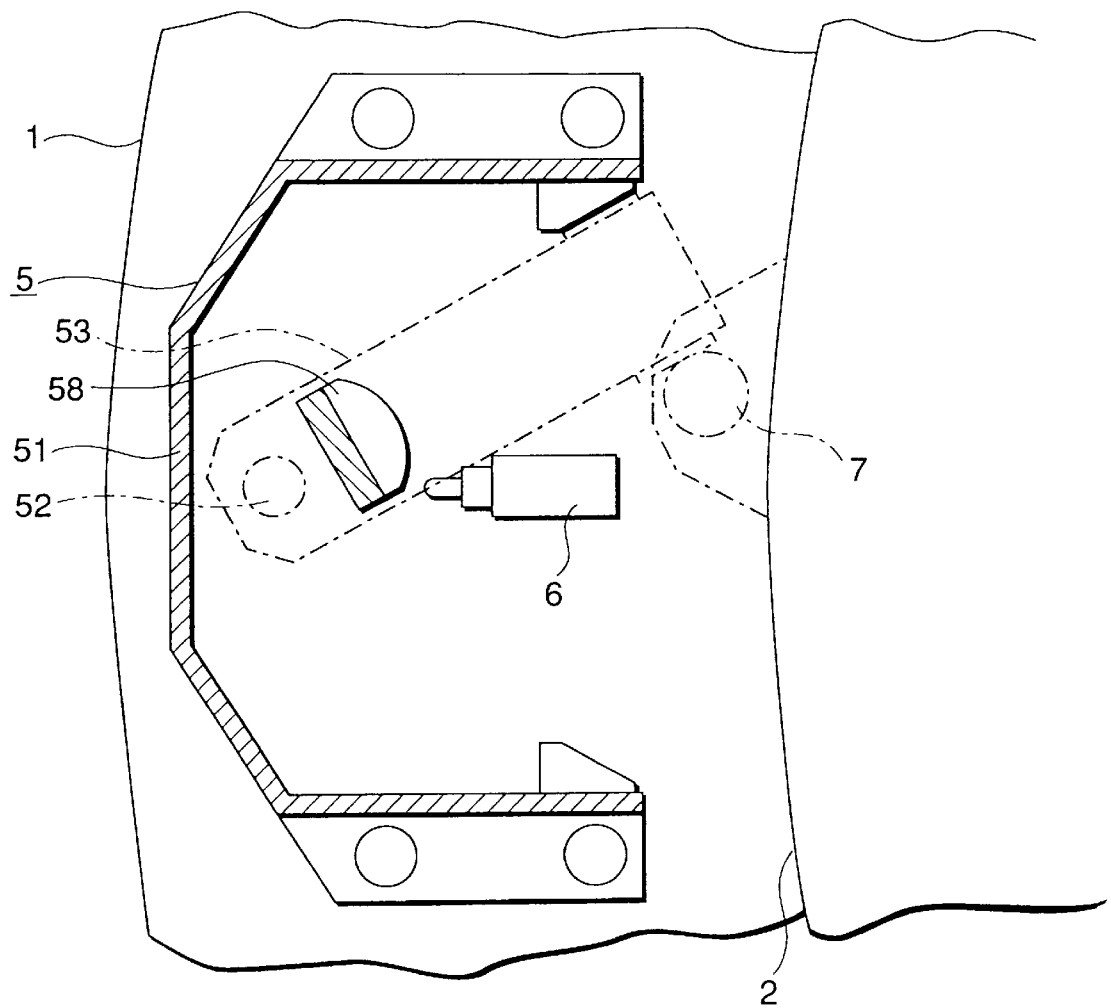
FIG. 4 is a plan view which is taken across line B—B shown in FIG. 2 and shows the principal elements when the stopper according to the first embodiment is in operation.

As shown in FIG. 4, simultaneously with pivotal movement of the engagement lever 53, the cam 58 is also pivoted, thereby disengaging the cam 58 from the position detector 6. The position detector 6 then detects that the turning base 2 has turned through a given angle and sends a signal to an unillustrated drive device for use with the turning base 2, thereby deactivating the drive device.

Figure 3:
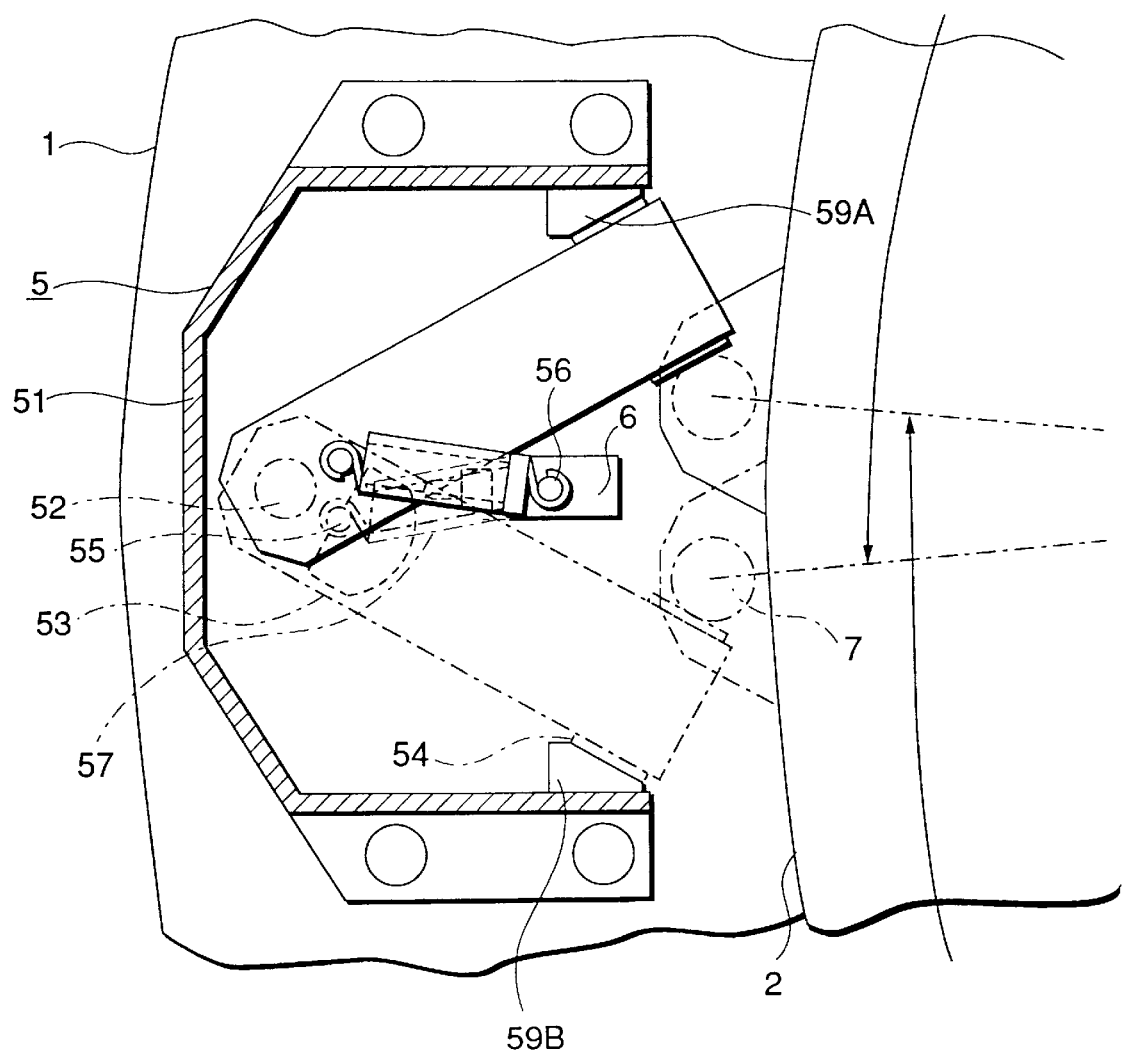
FIG. 3 is a plan view which is taken across line A—A shown in FIG. 2 and shows the principal elements when the stopper according to the first embodiment is in operation.

When the engagement dog 7 comes into collision with the engagement lever 53, in the manner as designated by a dashed line shown in FIG. 3, as a result of counterclockwise pivotal movement of the turning base 2, the engagement lever 53 comes into collision with the stopper 59B. Similarly, the cam 58 turns and disengages from the position detector 6, so that the position detector 6 detects that the turning base 2 has turned through a given angle.

As mentioned previously, since the engagement lever 53 turns around the retaining shaft 52 and comes into collision with the engagement dog 7, the operating angle of the turning base 2 is increased so as to correspond to the pivotal stroke of the engagement lever 53. So long as the pivotal stroke of the engagement lever 53 is increased, the limit of operating angle of the turning base 2 can be set to a value of 360° or more.

Figure 5:
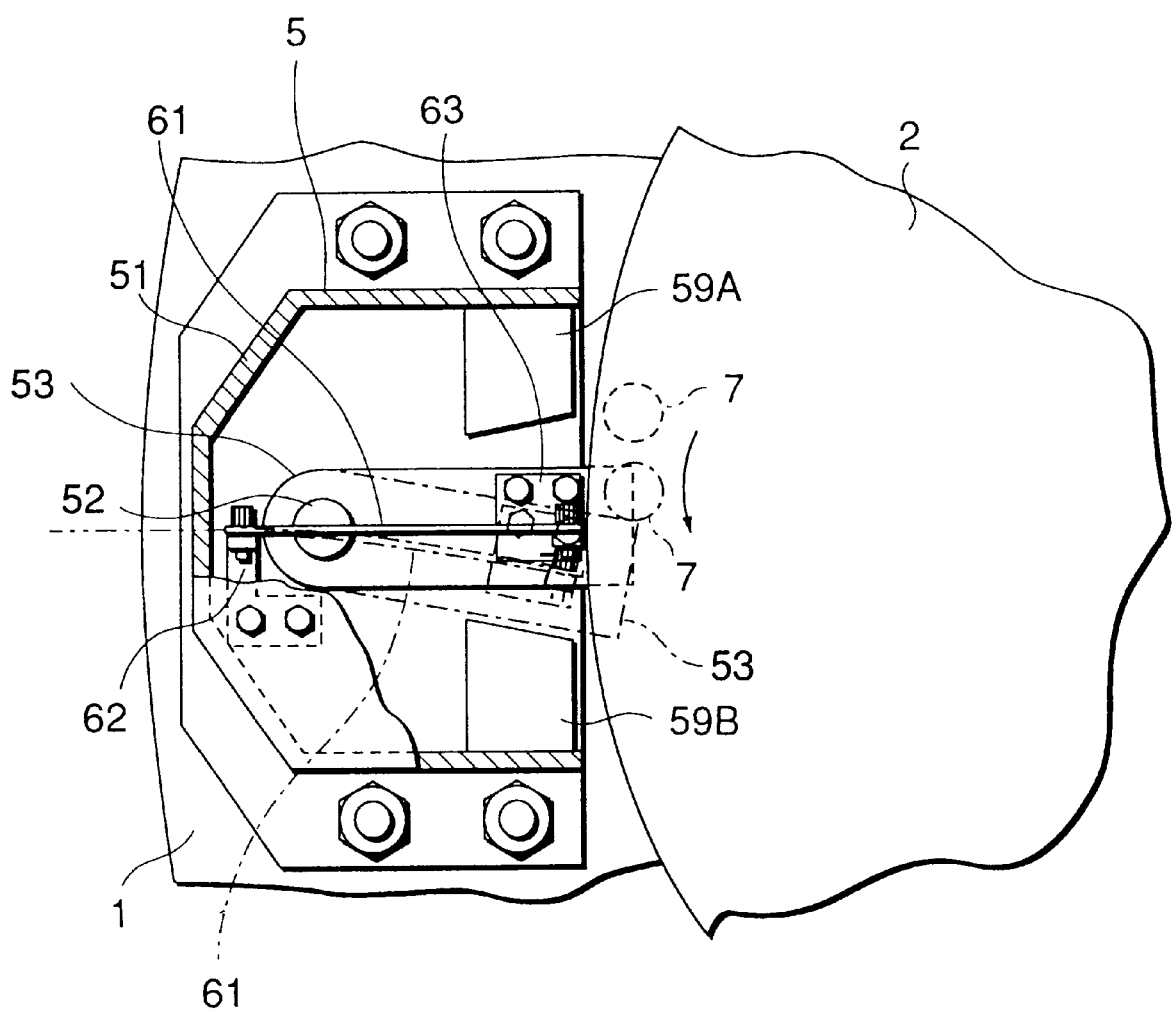
FIG. 5 is a plan view showing the principal elements of a stopper for use in an industrial robot according to a second embodiment of the present invention.
Figure 6:
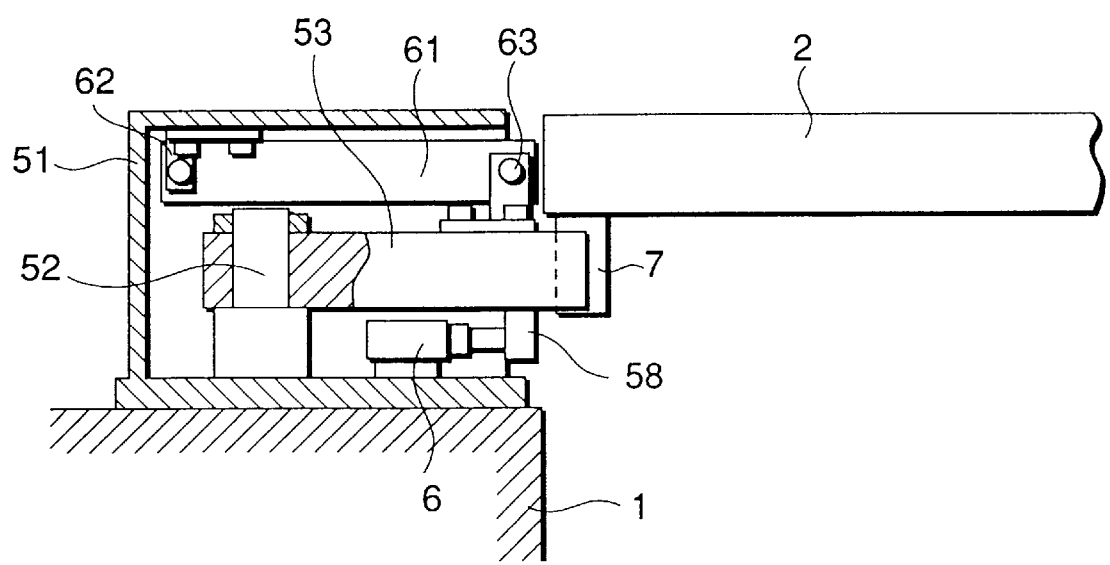
FIG. 6 is a sectional side view showing the principal elements of the stopper according to the second embodiment.
Figure 7:
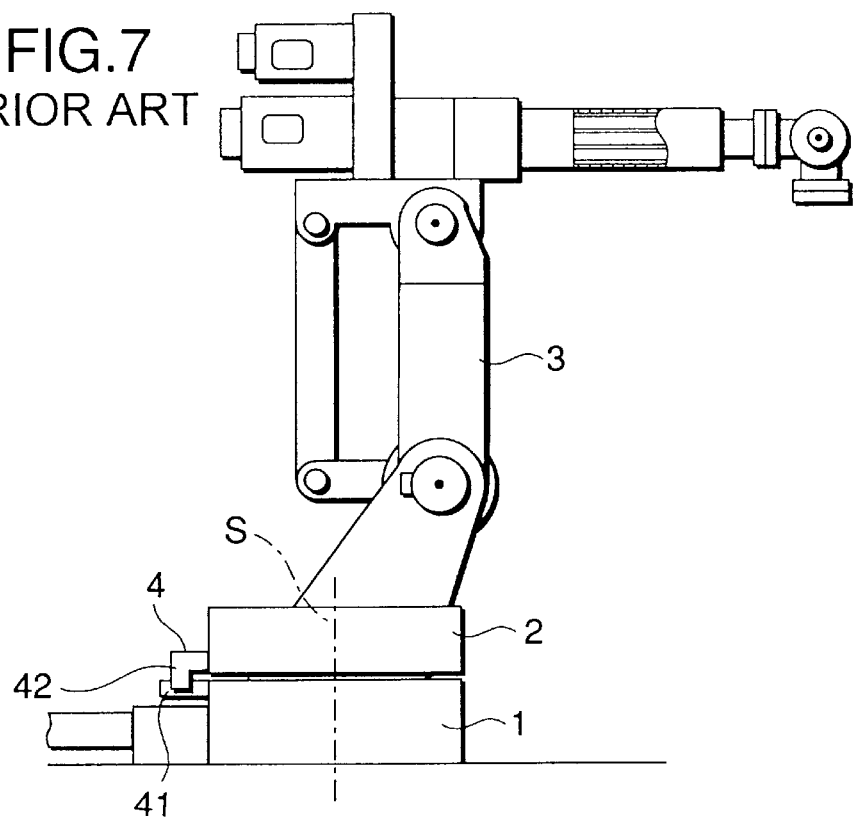
FIG. 7 is a side view showing a general view of an existing stopper.
Figure 8:
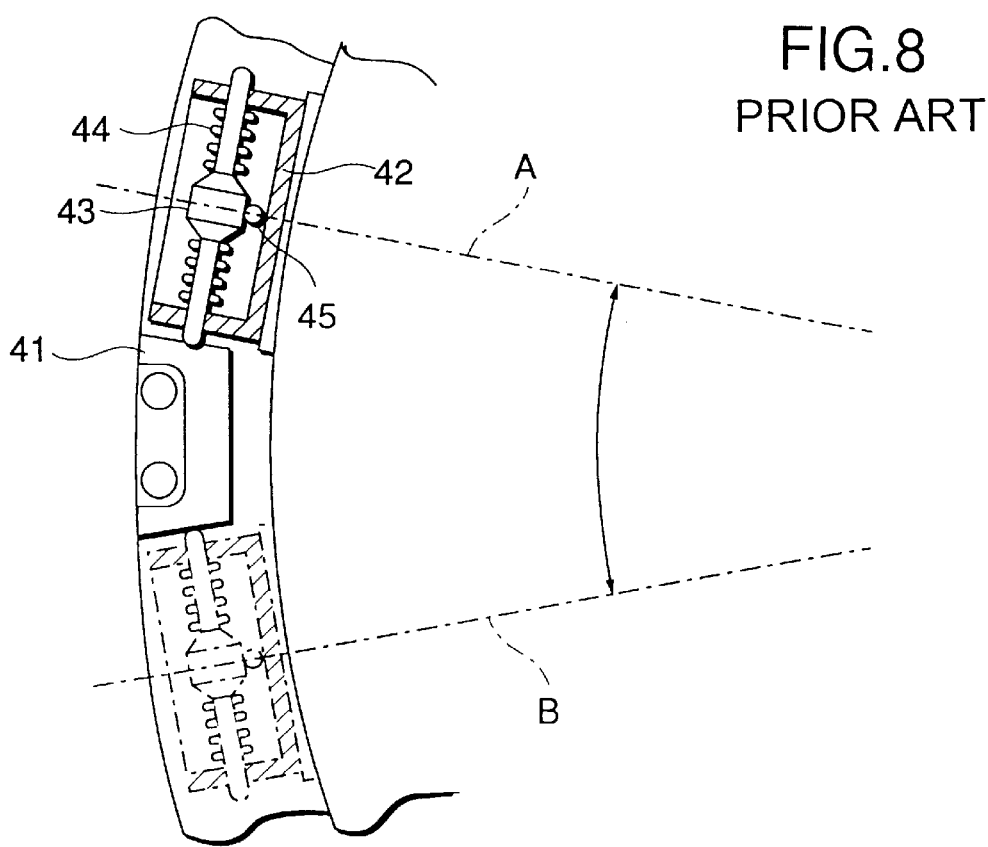
FIG. 8 is a plan view showing the principal elements of the existing stopper.

Next, a stopper for use with an industrial robot according to a second embodiment of the present invention will be described. FIG. 5 is a plan view showing the principal elements of the stopper according to the second embodiment; and FIG. 6 is a sectional side view showing the stopper. Since the stopper according to the second embodiment is substantially the same in operation and configuration as the stopper according to the first embodiment, an explanation will be given of the difference between the stoppers according to the first and second embodiments.

Instead of the tension spring 57 according to the first embodiment, a leaf spring 61 is disposed in tandem with the engagement lever 53 held in a neutral position. The leaf spring 61 is fixed at one end to the frame 51 by way of a fixture 62 and is fixed at the other end to the position on the engagement lever 53 spaced away from the retaining shaft 52 by way of a fixture 63. The leaf spring 61 operates so as to return the engagement lever 53 to the neutral position when the engagement lever departs from the neutral position. When the engagement lever 53 is in the neutral position, the leaf spring 61 produces substantially no force. Accordingly, the retaining shaft 52 and the fixtures 62, 63 may have a structure simpler than the structure of the retaining shaft and the fixtures employed in the first embodiment.

Although an explanation has been given of the example in which the stopper 5 is mounted on the mount base 1 and the engagement dog 7 is mounted on the turning base 2, the stopper 5 may be provided on the turning base 2 and the engagement dog 7 may be provided on the mount base 1.

Further, although an explanation has been given of the example in which only one engagement dog 7 is provided on the turning base 2 and the limit of operating angle of the turning base 2 is set to a value of 360° or more, the limit of operating angle of the turning base may be arbitrarily set by placing two engagement dogs 7 in arbitrary positions around the turning base 2.

As mention previously, the present invention yields the following advantages of:

(1) being able to set the limit of operating angle of the turning base to a value of 360° or more, thereby ensuring a wide operating range;

(2) being able to arbitrarily set the limit of operating angle by providing the stopper with two dogs;

(3) being able to provide a stopper which has a small volumetric capacity because of an engagement lever and a spring positioned overlapping and which permits placement almost anywhere; and (4) being able to provide a stopper which requires a smaller number of components, a simple structure, and a high degree of reliability.

INDUSTRIAL APPLICABILITY OF THE INVENTION

The present invention can be applied to an industrial robot, and more particularly, to a rotary shaft mechanism whose operating angle exceeds 360° or more.

We claim:

1. A stopper for use with an industrial robot including a mount base, a turning base capable of turning over the mount base about a pivot extending in the vertical direction, a fixed engagement section fixed to the mount base, a turning engagement section fixed to the turning base, and the fixed engagement section engaging the turning engagement section as a result of turning of the turning base, the stopper comprising:

a frame fixable to the mount base;

a retaining shaft fixable to the frame in an upright position in relation to the plane of rotation of the turning base;

a rod-shaped engagement lever which is supported at one end so as to be able to turn around the retaining shaft and extends toward a predetermined position;

a spring for returning the engagement lever to a position where it faces said predetermined position;

a stopper provided on an inner surface of the frame which faces the engagement lever; and an engagement dog fixable to the turning base and capable of engaging the engagement lever.

2. The stopper according to claim 1, wherein the spring is a tension spring and one end of the tension spring is held by the engagement lever by way of a pin at a position away from the retaining shaft, and the other end of the tension spring is held by a pin at a position which is further from the retaining shaft than the foregoing end of the tension spring.

3. The stopper according to claim 1, wherein the spring is a leaf spring, one end of the leaf spring is fixed at a position on the engagement lever away from the retaining shaft, and the other end of the leaf spring is coupled to the frame.

4. The stopper according to claim 3, further comprising:

a first fixture adapted to be mounted to the frame;

a second fixture mounted on the engagement lever, wherein one end of the leaf spring is coupled to the first fixture and the other end of the leaf spring is coupled to the second fixture to bias the engagement lever to a predetermined position relative to the frame.

5. The stopper according to claim 1, further comprising two engagement dogs which can be provided at arbitrary positions around the turning base.

6. The stopper according to claim 1, further comprising:

a buffer mounted on the engagement lever, wherein the buffer engages the stopper to limit the rotation of the engagement lever.

7. The stopper according to claim 1, further comprising:

two buffers mounted on opposite sides of the engagement lever, wherein the dog engages the buffer on a first side of the engagement lever, the engagement lever rotates as the turning base turns until the buffer on a second side of the engagement lever engages the stopper on the frame.

8. The stopper according to claim 1, further comprising a cam attached to a position on the engagement lever and a position detector which can detect an overrun of the turning base when engaging the cam.

9. A stopper for use with an industrial robot including a mount base and a turning base capable of turning over the mount base about a pivot extending in the vertical direction, the stopper comprising:

a frame fixable to the mount base;

a retaining shaft located on the frame and fixable in an upright position in relation to the plane of rotation of the turning base;

an engagement lever which is supported at one end so as to be able to turn around the retaining shaft and extends toward a predetermined position;

means for biasing the engagement lever to the predetermined position;

a stopper provided on an inner surface of the frame which faces the engagement lever; and an engagement dog fixable to the turning base and capable of engaging the engagement lever.

10. The stopper according to claim 9, wherein the means for biasing comprises a tension spring, the engagement lever includes a first pin at a position away from the retaining shaft, the frame includes a second pin at a distance from the retaining shaft which is greater than the distance of the first pin to retaining shaft, and one end of the tension spring is held by the first pin and the other end of the tension spring is held by the second pin.

11. The stopper according to claim 9, wherein the means for biasing is a leaf spring, one end of the leaf spring is fixed at a position on the engagement lever away from the retaining shaft, and the other end of the leaf spring is coupled to the frame.

12. The stopper according to claim 11, further comprising:

a first fixture adapted to be mounted to the frame;

a second fixture mounted on the engagement lever, wherein one end of the leaf spring is coupled to the first fixture and the other end of the leaf spring is coupled to the second fixture to bias the engagement lever to a predetermined position relative to the frame.

13. The stopper according to claim 9, further comprising:

a buffer mounted on the engagement lever, wherein the buffer engages the stopper to limit the rotation of the engagement lever.

14. The stopper according to claim 9, further comprising:

two buffers mounted on opposite sides of the engagement lever, wherein the dog engages the buffer on a first side of the engagement lever, the engagement lever rotates as the turning base turns until the buffer on a second side of the engagement lever engages the stopper on the frame.

15. The stopper according to claim 9, further comprising:

a cam attached to a position on the engagement lever; and a position detector which can detect an overrun of the turning base when engaging the cam.

16. A stopper for use with an industrial robot including a mount base and a turning base capable of turning over the mount base about a pivot extending in the vertical direction, the stopper comprising:

a frame fixable to the mount base;

a shaft fixed to the frame;

an engagement lever which is supported on the shaft so as to be rotatable about the shaft;

means for biasing the engagement lever to a position relative the frame;

a stopper provided on an inner surface of the frame, the inner surface facing the engagement lever; and an engagement dog fixable to the turning base and capable of engaging the engagement lever.

17. The stopper according to claim 16, wherein the means for biasing comprises a tension spring, the engagement lever includes a first pin at a position away from the retaining shaft, the frame includes a second pin at a distance from the retaining shaft which is greater than the distance of the first pin to the retaining shaft, and one end of the tension spring is held by the first pin and the other end of the tension spring is held by the second pin.

18. The stopper according to claim 16, wherein the means for biasing is a leaf spring, one end of the leaf spring is fixed at a position on the engagement lever away from the retaining shaft, and the other end of the leaf spring is coupled to the frame.

19. The stopper according to claim 16, further comprising:

a cam attached to the engagement lever; and a position detector which can detect an overrun of the turning base when engaging the cam.

20. The stopper according to claim 16, further comprising:

a buffer mounted on the engagement lever, wherein the dog engages the engagement lever and the buffer engages the stopper to limit the rotation of the engagement lever.

* * * * *